US007921248B2

(12) United States Patent
Brinksmeier et al.

(10) Patent No.: US 7,921,248 B2
(45) Date of Patent: Apr. 5, 2011

(54) CONFIGURATION FACILITY FOR THE CONFIGURATION OF A TIME-TRIGGERED BUS SYSTEM

(75) Inventors: Kai Brinksmeier, Paderborn (DE); Ralf Stolpe, Paderborn (DE); Nico Loose, Paderborn (DE)

(73) Assignee: dSpace digital signal processing and control engineering GmbH, Paderborn (DE)

( * ) Notice: Subject to any disclaimer, the term of this patent is extended or adjusted under 35 U.S.C. 154(b) by 148 days.

(21) Appl. No.: 12/274,466

(22) Filed: Nov. 20, 2008

(65) Prior Publication Data

US 2010/0083119 A1  Apr. 1, 2010

(30) Foreign Application Priority Data

Sep. 26, 2008  (DE) .......................... 10 2008 049 244

(51) Int. Cl.
*G06F 13/42* (2006.01)
(52) U.S. Cl. ........ 710/105; 710/305; 710/306; 702/123; 702/100
(58) Field of Classification Search .................. 710/105, 710/305–306, 117; 702/123, 100
See application file for complete search history.

(56) References Cited

U.S. PATENT DOCUMENTS

| 2006/0083173 A1 | 4/2006 | Jordan et al. | |
| 2008/0022288 A1* | 1/2008 | Bekooij | 718/107 |

FOREIGN PATENT DOCUMENTS

WO  WO 03/021889 A1  3/2003

OTHER PUBLICATIONS

"Design and implementation of a use interface to the visualization of the scheduling of distributed communicating real time tasks", Kai Brinksmeier, Universität Paderborn, Die Universidät der Informationsgesellschaft, Paderborn, Germany, Aug. 2005.
"Conception of a user interface for the modeling and manipulation of constraint of distributed communicating time controlled tasks", Nico Loose, Universität Paderborn, Die Universidät der Informationsgesellschaft, Paderborn, Germany, Jul. 2006.
European Search Report for EP 09010968 dated Dec. 18, 2009 (with machine translation).
German Search Report dated Apr. 20, 2009 (with English language machine translation).
Software Development for Distributed Systems in the Car, Prof. Qualified Engineer Dr. Wolfgang Pree, 2007, pp. 1-64.
Symtavision—SymTA/S Overview; httwp:/www.symtavision.com/symtas.html; Mar. 27, 2008, pp. 1-3.
Implementation Software; dSpace FlexRay Configuration Package; 2008; pp. 162-166.
FlexRay and AUTOSAR, Stephan Reichelt, Dr. Karsten Schmidt, Frank Gesele, Nils Seidler, Prof. Dr. Wolfram Hardt; I/AEV-2, FlexRay and AUTOSTAR, Nov. 17, 2007, pp. 1-22.

* cited by examiner

*Primary Examiner* — Paul R Myers
*Assistant Examiner* — Kim T Huynh
(74) *Attorney, Agent, or Firm* — Orrick, Herrington & Sutcliffe LLP

(57) ABSTRACT

A configuration facility is presented and specified, with at least one computer unit and a display device for the configuration of a time-triggered bus system. The bus system has at least two bus nodes and a data bus connecting the bus nodes. At least one node task and at least one transmission task can be executed at the bus nodes. The node tasks can be presented in time sequence in a node task field, the transmission tasks can be presented in time sequence in a transmission task field separate from the node task field, and the node tasks and the transmission tasks can be coordinated with each other by graphic allocation.

14 Claims, 7 Drawing Sheets

CONFIGURATION FACILITY FOR THE CONFIGURATION OF A TIME-TRIGGERED BUS SYSTEM

Figure 1:
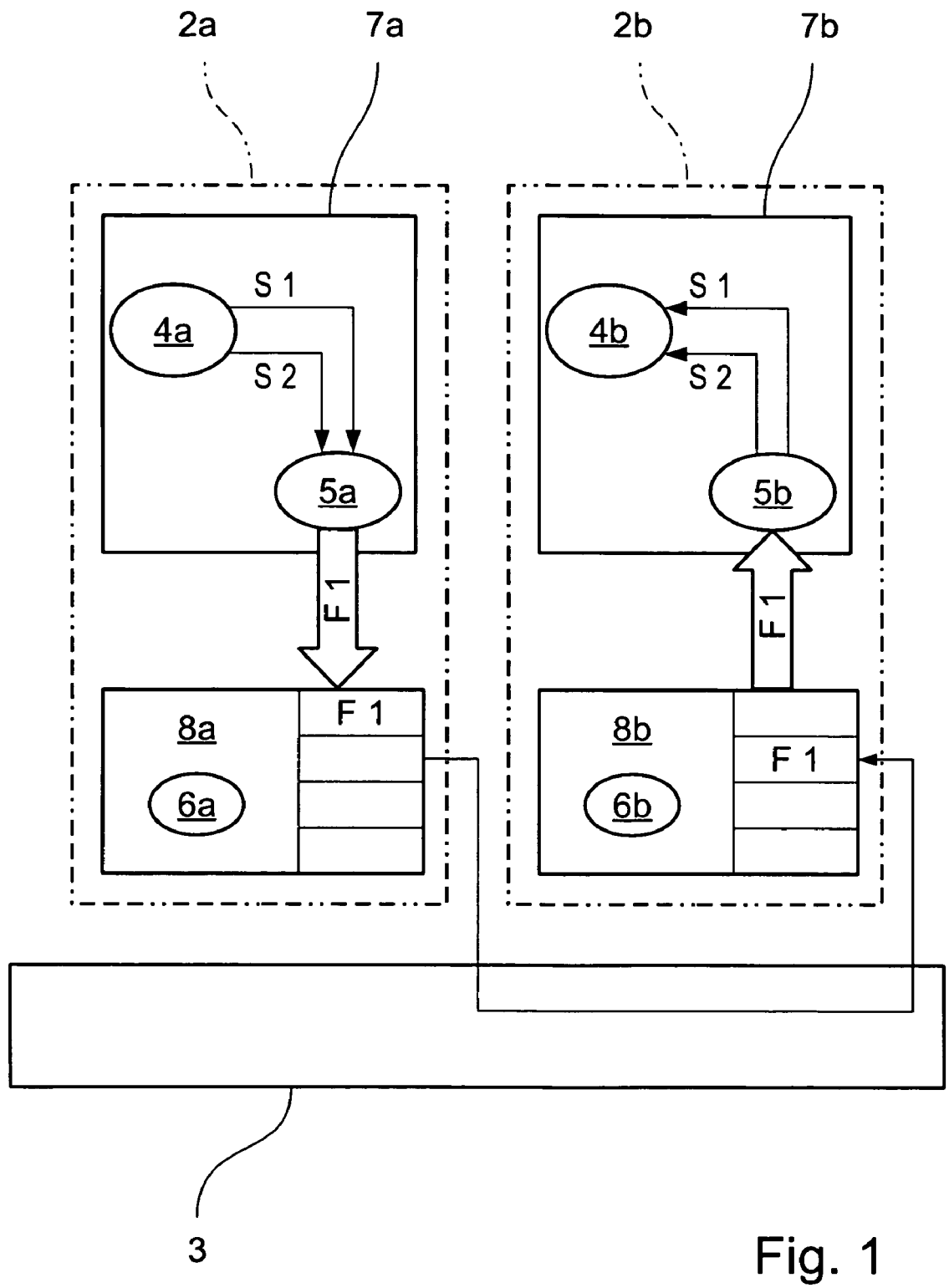

Applicants hereby claim priority under 35 USC §119 to German Patent Application No. 10 2008 049 244.2 entitled "Configuration Facility For the Configuration Of A Time-Triggered Bus System" filed in the German Patent Office on Sep. 26, 2008 incorporated herein by reference.

The invention concerns a configuration facility with at least one computer unit and a display device for the configuration of a time-triggered bus system, wherein the bus system has at least two bus nodes and a data bus connecting the bus nodes, wherein at least one node task and at least one transmission task can be executed at the bus nodes and wherein the node tasks and the transmission tasks can be presented in time sequence, scheduled in time and coordinated with each other by means of the configuration facility in the course of the configuration and at least one node task program and at least one transmission task program can be created on the basis of the configuration performed, by means of which the node tasks and the transmission tasks can be implemented at the bus nodes. Furthermore, the invention also concerns a method for creating of at least one node task program and at least one transmission task program for a time-triggered bus system, wherein the bus system has at least two bus nodes and a data bus connecting the bus nodes, wherein a node task can be implemented with the node task program at a bus node, and wherein at least one transmission task can be implemented with the transmission task program at one of the bus nodes, wherein the node tasks and the transmission tasks are first scheduled relative to each other in time, presented and coordinated with each other by a configuration of the bus system.

Configuration facilities of the general type discussed here only became familiar a few years ago, which is especially due to the circumstance that time-triggered bus systems were only developed a few years ago and have only recently been used in demanding series applications. Typical applications lie especially in those fields where complex distributed processes extending in space need to be acted upon and controlled with high reliability in the broadest sense.

Time-triggered bus systems differ from event-triggered bus systems in that the bus communication—i.e., the sending and receiving of messages via the data bus of the bus system—occurs for the most part in a fixed time plan, or schedule. At certain configured moments of time or during certain intervals of time—slots—only one participant of the bus system—bus node—stipulated in the course of the configuration can actively use the data bus for the relaying of data. Such behavior is not known for event-triggered bus systems, where various bus nodes can compete for access to the data bus of the bus system, and the time of access will depend on certain events, whose occurrence in time is as a rule undetermined. Therefore, in event-triggered bus systems there can be faulty data transmissions—such as when the bus arbitration has a collision—and consequent time delays, and a particular time behavior cannot be guaranteed—despite various measures such as assigning priorities to bus participants. For this reason, event-triggered bus systems are little suited to safety-relevant applications, such as applications in the automotive field, where a high error tolerance is demanded and a secure observance of sampling times, for example, has to be guaranteed.

In the time-triggered bus systems considered here, two types of tasks are distinguished, which can be carried out at the bus nodes. First, there are the internal node tasks, which are not immediately perceivable outside of the bus node. Second there are the transmission tasks, which are responsible for the timely transmission of information via the data bus from one bus node to another bus node.

In the following, reference is made to a particular time-triggered bus system, namely, the FlexRay bus system, which has also found an entree into automotive serial products for some time now (x-by-wire applications). However, the configuration facility described here and the method for configuring a time-triggered bus system described here are not limited to this standard.

Within the FlexRay standard, application tasks and FTCom tasks are further distinguished for the node tasks. The application tasks implement an application at a bus node, such as the calculating of a feedback control algorithm. For example, values will be calculated which are to be sent via the data bus of the bus system to other bus participants. The application tasks are usually carried out at an internal computer unit of the bus node. The FTCom tasks pack and unpack these values in data packets, which are known as frames, and they moreover serve for the writing/reading of the frames by the internal computer unit of a bus node into/out of the buffer of a communication controller, which is connected to the internal computer unit of the bus node and makes up a part of the bus node. The frames/messages are held in readiness at the communication controller and sent or received by the transmission tasks via the data bus of the bus system in accordance with the time configuration. Thus, the transmission tasks serve for the transmission of messages by the bus.

It will be appreciated that the time sequence of performance of node tasks and transmission tasks at a bus node, on the one hand, as well as the time sequence of performance of node tasks and transmission tasks at different nodes, on the other hand, can stand in time dependency relationships. For example, transmission tasks can only send certain—relevant—messages in a meaningful manner if the signals contained in the messages are already present as a result of the underlying node tasks. Likewise, calculations at bus nodes which are dependent on calculation results of other bus nodes can only be performed in meaningful manner if the information-preparing calculations of the other nodes have already been completed and the results of these calculations have already been made available to the receiving bus node via the data bus of the bus system.

The above described dependencies should be taken into account when configuring a time-triggered bus system, and the configuration, or scheduling of the time and ordering of the entirety of all node tasks and transmission tasks of a time-triggered bus system, can be very complicated, depending on the number of tasks and bus nodes present in the bus system.

Configuration facilities can ease the configuration process of a time-triggered bus system by providing technical aids for assigning node tasks and transmission tasks to a bus node and also presenting all node tasks and transmission tasks of the bus system so that they are ordered in time and can be scheduled and coordinated with each other. "Scheduled" may refer to when the configuration facility allows for a setting of execution times—and if necessary the frequency of the execution—and "coordinated with each other" may refer to the fact that it can be determined which bus nodes communicate with each other.

One aspect of the present invention involves specifying a configuration facility and method which provides technical means for the scheduling, ordering, and coordinating of node tasks and transmission tasks so as to simplify later creation of node task and transmission task programs.

In accordance with another aspect of the invention, the node tasks can be presented in time sequence in a node task field, the transmission tasks can be presented in time sequence in a transmission task field separate from the node task field, and the node tasks and the transmission tasks can be coordinated with each other by graphic allocation means.

Thanks to the presentation of the node tasks and the transmission tasks in separate fields, namely, in the node task field and in the transmission task field, it is generally possible to present a separate overview of the node tasks, which are responsible for the internal functioning and therefore are related to each other in content, and the transmission tasks, which are responsible for the communication on the data bas and therefore are related to each other in content, and to make these tasks more easily available for the configuration, namely, the scheduling and coordinating.

It will be appreciated that when we say that the node tasks and transmission tasks presented in the fields different from each other, namely, the node task field and the transmission task field, can be coordinated by graphic allocation means, it is also possible to coordinate only parts of these different tasks with each other. On the example of the FlexRay bus, this means, for example, that only the FTCom tasks included among the node tasks may be connected to or coordinated with the transmission tasks, since the application tasks likewise included among the node tasks are only in communication with the FTCom tasks; the coordination capability should be understood in this general sense.

In accordance with another aspect of the invention, the presentation of the node tasks in the node task field and the presentation of the transmission tasks in the transmission task field is either time-dependent or time-independent, and the presentation can preferably switch between time dependency and time independency. In particular, the presentation of the transmission tasks in the transmission task field in time independency of the presentation of the node tasks in the node task field allows tasks far apart in time to be coordinated with each other.

Even if the presentation of the node tasks in the node task field and the presentation of the transmission tasks in the transmission task field are independent of each other in time, this promotes the configurability of the time-triggered bus system so designed, since the node tasks involving the internal calculation and communication are arranged separately from the transmission tasks involving the bus communication.

It has proven to be especially advantageous for the presentation of the node tasks in the node task field and/or the presentation of the transmission tasks in the transmission task field to be scalable in time, so that the user can decide which time resolution and thus information density to use for the presenting of the node tasks and transmission tasks ordered in time sequence, which is critical to the general overview of the configuration produced and beneficially influences the ease of coordinating the different tasks; the time scaling feature also enables a "zooming" on the various task presentations.

In another preferred sample embodiment, the presentation of the node tasks in the node task field and/or the presentation of the transmission tasks in the transmission task field is a segment of the overall time configuration, so that it is also possible to do the presentation in a high temporal resolution in a comparatively manageable task field. In this case, it has proven to be especially practical for the presented time segment to be selectable from the overall configuration and, for example, to be shiftable. It is then possible to present coordinated node tasks of the node task field and transmission tasks of the transmission task field close together in a limited space and assign them to each other with graphic allocation means.

In preferred embodiments of the invention, the presentation of the node tasks in the node task field and/or the presentation of the transmission tasks in the transmission task field is done as a bar chart, and the graphic allocation means comprise directional lines of connection between these tasks. The bar chart representation also allows a consideration of the fact that each task in itself also has an extent in time, contingent upon the time needed to perform the task.

According to another aspect of the invention, the node tasks are presented in time sequence in a node task field, the transmission tasks are presented in time sequence in a transmission task field separate from the node task field, and the node tasks and the transmission tasks are coordinated with each other by graphic allocation means. The method as a whole can be amplified by the method steps which can be carried out with the above detailed configuration facility.

The invention moreover concerns a computer program with program code in order to carry out all of the steps performed by the above-described method when the program is executed on a corresponding data processing system. The invention also concerns a computer program with program code of the above-described kind, which are saved on a computer-readable data medium.

Figure 2:
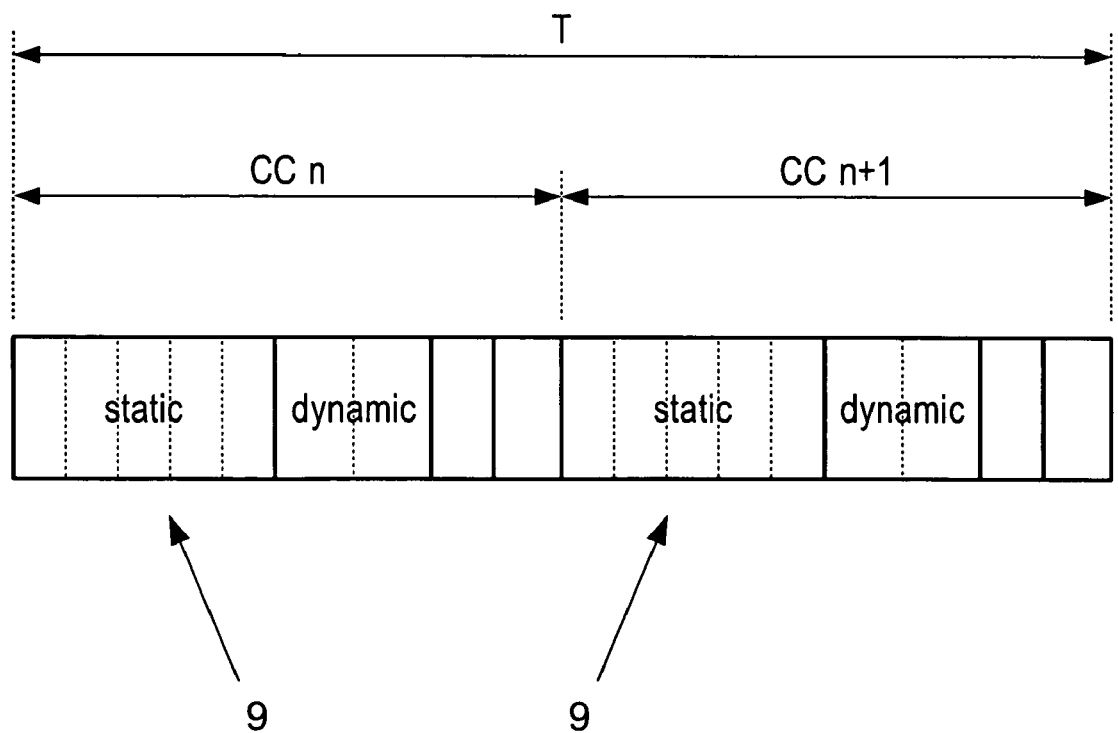
Figure 4:
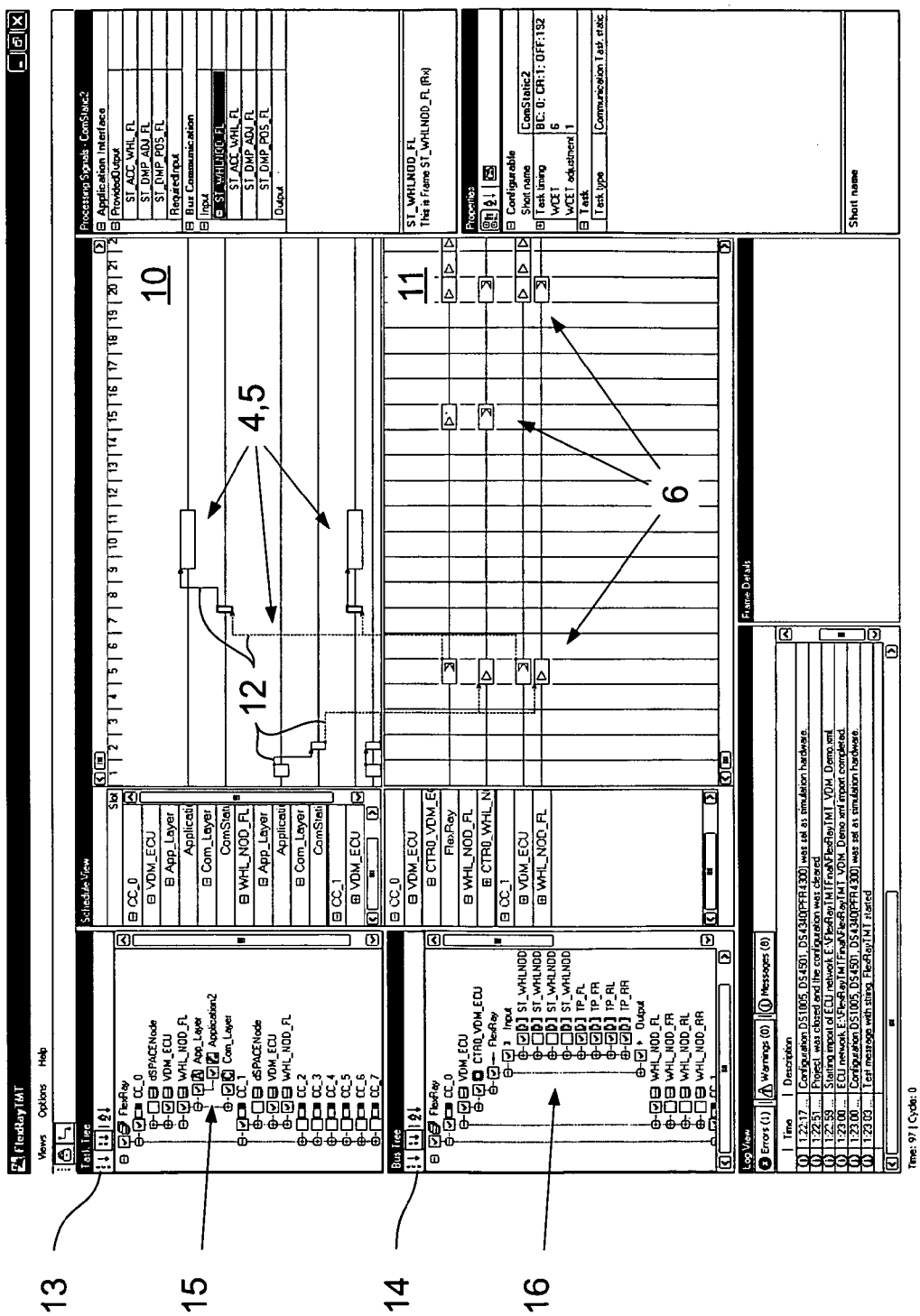
Figure 5:
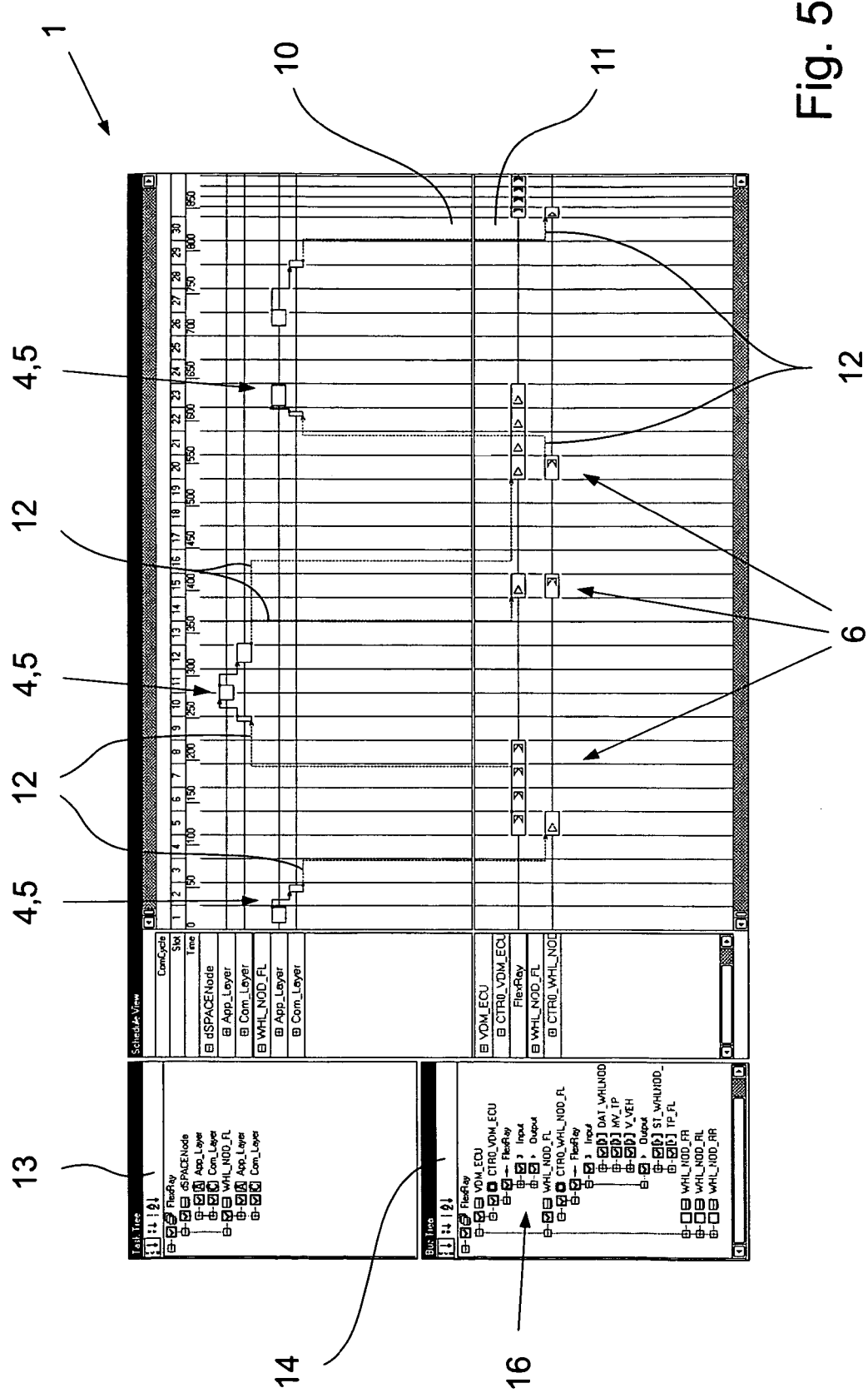

Specifically, there are a multitude of possibilities for configuring and modifying the invented configuration facility and the invented method for configuration of a time-triggered bus system. For this, we refer on the one hand to the patent claims, and on the other hand to the following description of sample embodiments in connection with the drawing. The drawing shows:

FIG. 1, a schematic diagram of a time-triggered bus system with two bus nodes and a data bus, based on the FlexRay Standard, FIG. 2, a time slot pattern for the configuration of a time-triggered bus system, here on the example of the FlexRay Standard, FIG. 3, the sample embodiment of a display device of a configuration facility according to the invention with separate node task field and transmission task field, FIG. 4, another sample embodiment of the display device of a configuration facility according to the invention with a time coupled view of node task field and transmission task field with superimposed graphic allocation means, FIG. 5, another sample embodiment of the display device of a configuration facility according to the invention with node task field and transmission task field, FIG. 6, another sample embodiment of the display device of a configuration facility according to the invention with highlighted instances of a message sent via the bus system, and FIG. 7, a final sample embodiment of the display device of a configuration facility according to the invention with a selection of represented node tasks and transmission tasks from the totality of available node tasks and transmission tasks.

Figure 3:
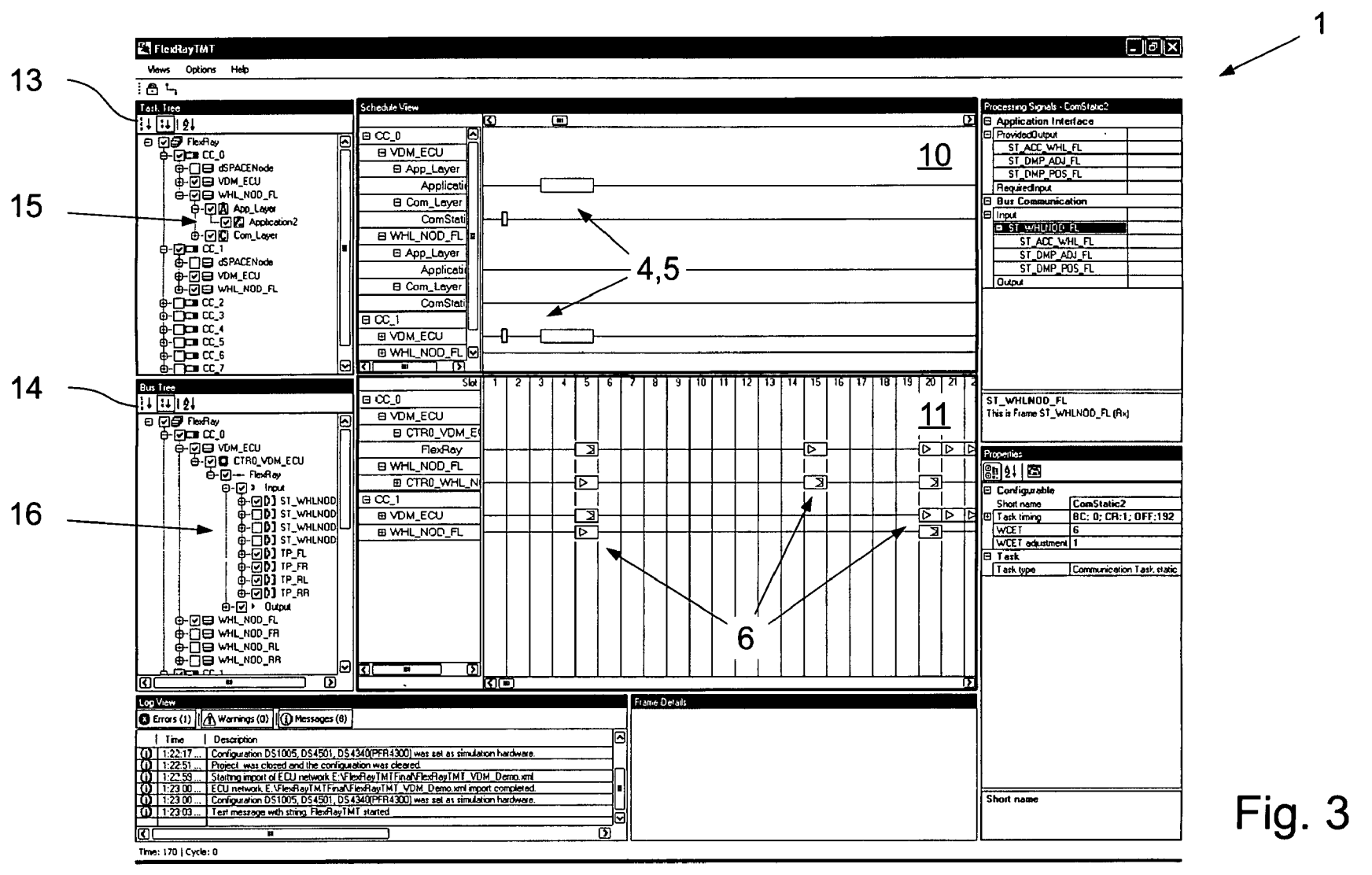
Figure 6:
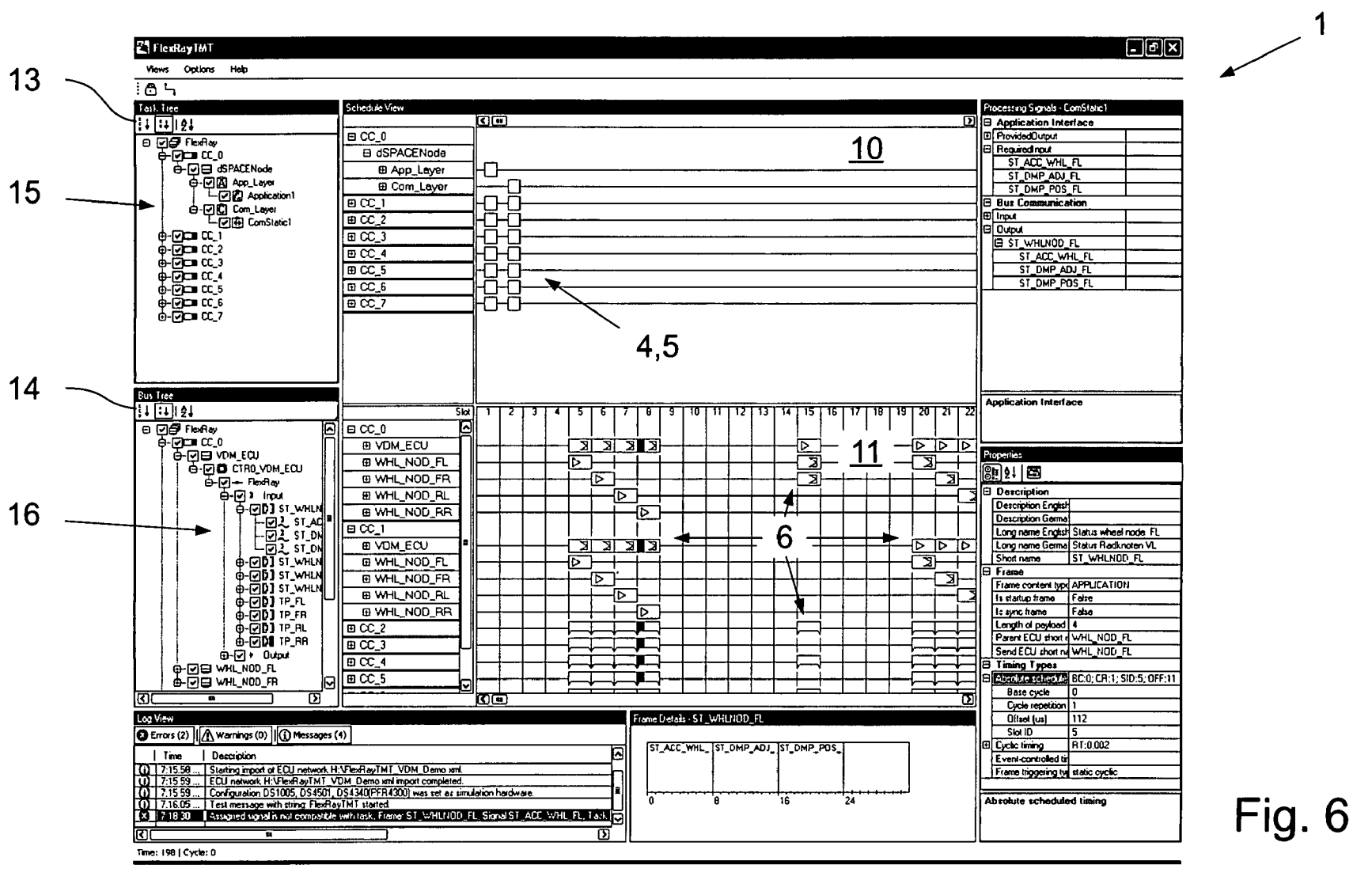
Figure 7:
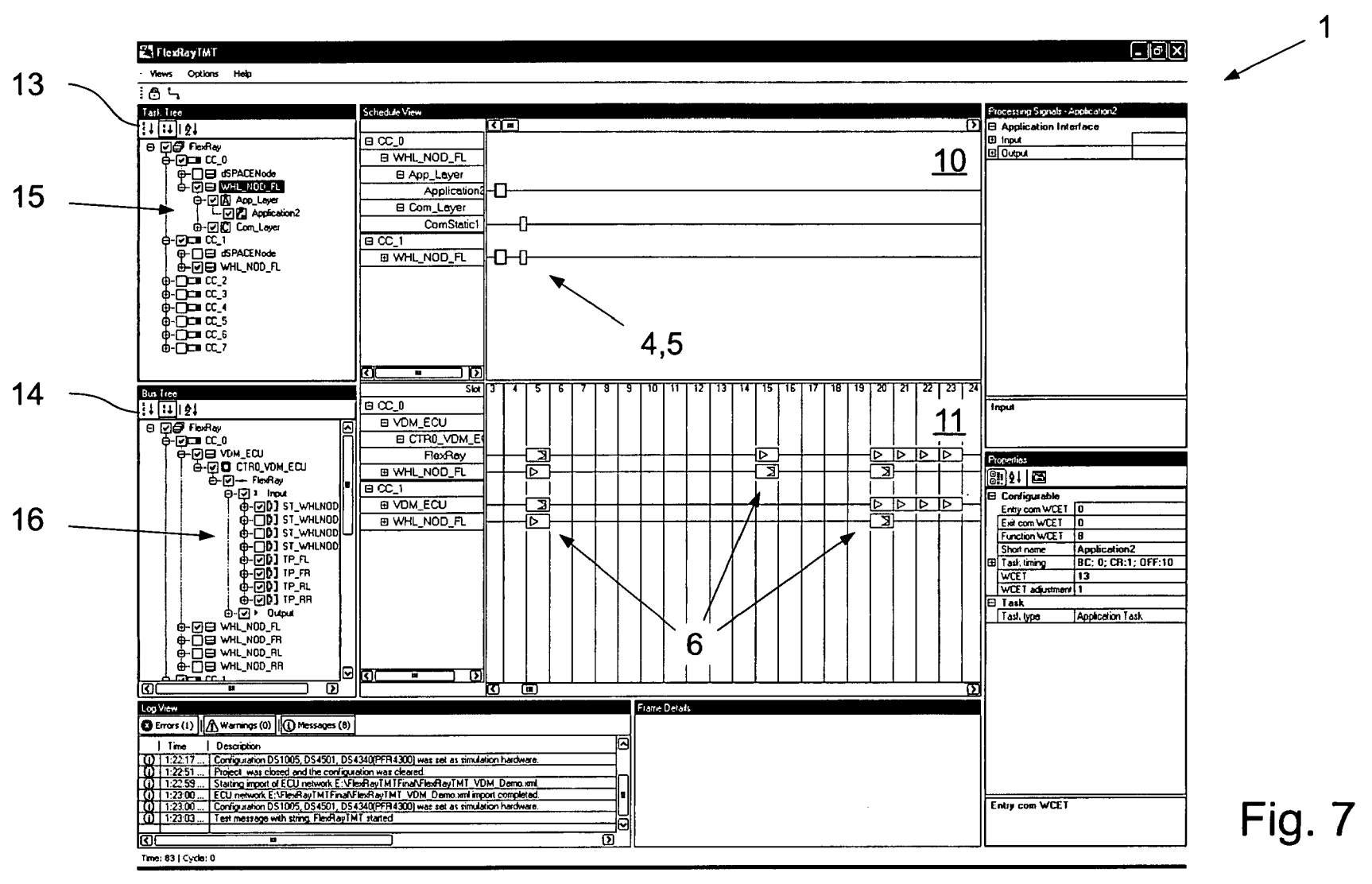

FIGS. 3 to 7 show as a whole the display 1 of a configuration facility according to one aspect of the invention. The computer unit included in the configuration facility is not explicitly shown. The configuration facility serves on the whole to configure a time-triggered bus system, shown in FIG. 1, wherein the bus system has at least two bus nodes 2*a*, 2*b* and a data bus 3 connecting the bus nodes 2*a*, 2*b*. At least one node task 4*a*, 4*b*, 5*a*, 5*b* and at least one transmission task 6*a*, 6*b* can be executed at the respective bus nodes 2*a*, 2*b*. The bus system shown in FIG. 1 is a FlexRay bus and the configuration time slot pattern of the bus system as represented schematically in FIG. 2 likewise shows the configuration possibilities of a FlexRay bus.

The bus nodes 2*a*, 2*b* shown in FIG. 1 each comprises an internal computer unit 7*a*, 7*b* and a communication controller 8*a*, 8*b*. At the internal computer unit 7*a*, 7*b*, the node tasks 4*a*, 5*a*; 4*b*, 5*b* not immediately perceivable to the outside are executed by the internal computer unit 7*a*, 7*b* working off the node task program on which they are based.

The node tasks 4*a*, 5*a*; 4*b*, 5*b* here comprise two components each, namely, application tasks 4*a*, 4*b* and FTCom tasks 5*a*, 5*b*. The application tasks 4*a*, 4*b* serve to execute algorithms which are related to the technical-physical process, not being represented in the present case, but generally involving the bus nodes 2*a*, 2*b*. In the sample embodiment shown in FIG. 1, the application tasks 4*a*, 4*b* are feedback control algorithms, wherein the application task 4*a* generates the signals S1, S2, which are then further processed by the application task 4*b*. The FTCom tasks 5*a*, 5*b* pack and unpack the signals into a data packet F1, known as a frame. The FTCom tasks 5*a*, 5*b* relay these data packets on between the internal computer units 7*a*, 7*b* and the communication controllers 8*a*, 8*b*. The transmission tasks 6*a*, 6*b* are then responsible for the properly timed relaying of the data packet F1 via the data bus 3.

FIG. 2 shows quite schematically the basic layout of the time scheduling possibilities of a time-triggered bus system per the FlexRay Standard. The overall time scheduling period extends over the time interval T, and the time interval T is divided into several communication cycles CCn and CCn+1. In the present case, only two communication cycles are present, CCn and CCn+1; but usually considerably more communication cycles divide up the entire interval T. Each communication cycle is divided for the use of the data bus 3 into a statically scheduled and dynamically accessible period in respect of time, each designated as "static" and "dynamic". The node tasks 4*a*, 4*b*, 5*a*, 5*b* and the transmission tasks 6*a*, 6*b* can be allocated for the time-triggered bus system in question by the configuration of various time segments 9—or "slots"—which is not shown in detail in FIG. 2. Node tasks 4*a*, 4*b*, 5*a*, 5*b* and transmission tasks 6*a*, 6*b* can be coordinated with different communication cycles CCn and CCn+1 in the context of the FlexRay Standard, so that they can have a periodicity within the overall configuration interval T.

The problem of the configuration facility is to present the node tasks 4*a*, 4*b*, 5*a*, 5*b* and the transmission tasks 6*a*, 6*b* in time order in the context of the configuration and make it possible to schedule them in time and coordinate them with each other so that at least one node task program and at least one transmission task program can be created on the basis of the configuration done, by means of which the node tasks 4*a*, 4*b*, 5*a*, 5*b* and the transmission tasks 6*a*, 6*b* can be implemented at the real bus nodes 2*a*, 2*b*.

FIGS. 3 to 7 show the elements of a display device 1 of a configuration facility which enable a time configuration of the bus system in accordance with another aspect of the invention. Each time, the overall display of the display device 1 of the configuration facility is shown, the node tasks 4, 5 being presented in temporal sequence in a node task field 10 and the transmission tasks 6 being presented in temporal sequence in a transmission task field 11 different from the node task field 10, and it being possible to coordinate the node tasks 4, 5 and the transmission tasks 6 with each other by graphic allocation means 12.

The separate arrangement of the node tasks 4, 5 in the node task field 10 and the transmission tasks 6 in the transmission task field 11 is much more conspicuous than the joint handling of the node tasks 4, 5 and the transmission tasks 6 in a common task field, and the separate arrangement of the node tasks 4, 5 and the transmission tasks 6—as shown in FIG. 3 to 7—enormously facilitates the configurability of the bus system, since the user can identify at once which tasks are to be connected with which other tasks; thus, for example, a transmission task 6 can always only be connected with one node task 4, 5 at the input and output, and vice versa.

Referring to FIGS. 3 to 7, the scheduling time in the node task field 10 and in the transmission task field 11 is shown initially running horizontally from left to right, and also sometimes—such as in the node task field 10 in FIG. 5—with two time axes having different units, namely, one divided into various time "slots" and the other with a "time" axis.

In the sample embodiments shown, however, the time also runs partly in the vertical dimension in addition, which can be seen in that the consecutive communication cycles CC_0, CC_1 on the left side of the node task field 10 and the transmission task field 11 are listed from top to bottom, and within each communication cycle CC_0, CC_1 the corresponding bus nodes (VDM_ECU, WHL_NOD_FL, etc.) are listed that are called up within the particular communication cycle CC_0, CC_1. In the sample embodiments shown, therefore, the time axis runs made up like text lines, from left to right and from top to bottom.

The separate presentation of the node tasks 4, 5 in the node task field 10 on the one hand and that of the transmission tasks 6 in the transmission task field 11 on the other hand in a time dependency with each other, as in FIG. 5 for example, is of special advantage, since one can see here an idea as to the actual relative temporal coordination of the node tasks 4, 5 with the transmission tasks 6. In other situations, it is more advantageous for the presentation of the node tasks 4, 5 in the node task field 10 and the presentation of the transmission tasks 6 in the transmission task field 11 to be independent of each other in time, for then even tasks which are far apart in time can be presented in relative proximity to each other and a configuration of such tasks—such as a coordination of them—is very easily possible. In all sample embodiments presented here, the configuration facility is organized such that the presentation of the node tasks 4, 5 in the node task field 10 and the presentation of the transmission tasks 6 in the transmission task field 11 can switch back and forth, so that the benefits of both presentations can be utilized as needed.

The arrangement of the node tasks 4, 5 in the node task field 10 and the arrangement of the transmission tasks 6 in the transmission task field 11 are time-scalable by the configuration facility in FIGS. 3 to 7, so that the information density of the presentation can be adapted. In accordance with another aspect of the invention, in FIGS. 3, 4 and 6, 7, the presentation of the node tasks 4, 5 in the node task field 10 and the presentation of the transmission tasks 6 in the transmission task field 11 each show only one segment from the overall time configuration, and in the cases shown not all time slots which are scheduled or can be scheduled are represented in the horizontal dimension of the time axis. The segment actually represented can be adjusted with scroll bars. In this way, node tasks 4, 5 and transmission tasks 6 that are far apart in time can be arranged, presented and worked on in relative proximity to each other, which constitutes a substantial simplification over those configuration facilities in which node tasks are placed together with transmission tasks in a unified temporal representation.

In all of the particular sample embodiments explicitly illustrated here, the node tasks 4, 5 in the node task field 10 and the transmission tasks 6 in the transmission task field 11 are represented as bars, so that one has basically a bar chart for the overall configuration. This has the advantage that not only the starting time of a task 4, 5, 6 can be set and is evident, but also run times of the tasks 4, 5, 6 can be taken into account, which helps with scheduling security. The graphic allocation means 12 consist of directional lines of connection in the graphic representation, as can be seen in FIGS. 4 and 5.

FIG. 7 shows that the configuration facility may offer the possibility of selecting the node tasks 4, 5 to be presented in the node task field 10 and the transmission tasks 6 to be presented in the transmission task field 11 from the totality of the node tasks 4, 5 and the totality of the transmission tasks 6, which makes it possible to work on only the elements of the bus nodes that are of interest, while masking the elements of all other bus nodes. This is a major advantage for the configurability of the time-triggered bus system. FIG. 7 shows only what occurs in the communication cycles CC_0 and CC_1, all other communication cycles—namely, communication cycles CC_3 to CC_7, as seen in FIG. 6—are masked.

In addition, in the particular illustrative representations of the display 1 in FIG. 3 to 7 the configuration facility has, besides the node task field 10, a node bus structure field 12 coordinated with the node task field 10, and besides the transmission task field 11 a transmission bus structure field 14 coordinated with the transmission task field. The bus structure fields 13, 14 represent the elements of the bus system as tree diagrams, which enables a hierarchical representation of the elements of the bus system and a functional coordination. The organization of the bus structure fields 13, 14 can be hardware oriented in terms of bus elements, as in FIG. 5, or alternatively the tree diagrams of the bus structure fields 13, 14 can be schedule oriented in terms of scheduling times, as is shown in FIGS. 3, 4 and 6, 7. In all illustrative configuration facilities explicitly discussed here, the type of organization of the tree diagrams in the bus structure fields 13, 14 can switch back and forth. With the selection of the organization of the tree diagrams in the bus structure fields 13, 14, the organization of the corresponding representation in the task fields 10, 11 also changes, so that one always gets a consistent representation of the fields 10, 13 and 11, 14 whose content is being coordinated with each other.

In the bus structure fields 13, 14, the bus nodes are designated as "dSPACENode", "VDM_ECU" and "WHL_NOD_FL". Within the node task field 10 and the transmission task field 11, to the right of the nodes designated by name—such as VDM_ECU or WHL_NOD_FL—are presented on a horizontal line all the tasks coordinated with the respective node—thus, node tasks 4, 5 in the case of the node task field 10 and the transmission tasks 6 in the case of the transmission task field 11. It is likewise evident in the figures that the individual bus nodes are represented in the tree structure within the bus structure fields 13, 14, the corresponding communication controllers can be seen beneath the bus nodes—such as "CTR0_VDM_ECU"—and the input and output channels of the controllers beneath the respective communication controllers, along with the data packets or "frames" that are sent or received through them.

Referring to FIG. 6, all instances of such a frame, or actually a transmission task 6 sending out the frame, are displayed when such an instance is selected. In FIG. 6, for example, a transmission task 6 has been selected in Slot 8 in the transmission task field 11, residing on the bus node "VDM_ECU". The selection is indicated by the vertical line. Such a representation of instances makes it easier to find corresponding tasks in an overall configuration of the bus system. The selection of this transmission task 6 being received in the transmission task field 11 results in an analogous flagging of the element "TR_RR" thanks to the consistent representation in the corresponding transmission bus structure field 14. On the other hand, a selection of an element in a bus structure field 13, 14 leads to a corresponding selection and flagging of the corresponding element in the coordinated task field 11, 12.

The particular illustrative configuration facilities belonging to the displays 1 shown in FIGS. 3 to 7 likewise enable a coordination of node tasks 4, 5 with transmission tasks 6 by coordinating elements 15 of the node bus structure field 13 with elements of the transmission task field 11—thus, transmission tasks 6—and with elements 16 of the transmission bus structure field 14. Moreover, one can coordinate transmission tasks 6 with node tasks 4, 5 also by coordinating elements 16 of the transmission bus structure field 14 with elements of the node task field 10—i.e., with node tasks 4, 5—and with elements 15 of the node bus structure field 13, and in both cases the coordination is possible by drag & drop technique. The drag & drop technique can also be used for allocations between elements of the node task field 10 and the transmission task field 11; the graphic allocation means are then automatically set by the configuration facility.

The invention claimed is:

1. A configuration facility, comprising:
   a computer in communication with a time-triggered bus system, wherein the time-triggered bus system has at least two bus nodes and a data bus coupling the bus nodes,
   wherein a node task and a transmission task are executed at the bus nodes; and
   a display wherein the computer is programmed such that the node task is presented in time sequence in a node task field, the transmission task is presented in time sequence in a transmission task field separate from the node task field, and the node task and the transmission task are executed by the bus nodes according to a configuration generated through a user-manipulatable graphical interface; and
   wherein the computer determines a sequence and a schedule for executing the node task and the transmission task according to the configuration.

2. The configuration facility according to claim 1, wherein the presentation of the node tasks in the node task field and the presentation of the transmission tasks in the transmission task field is time-dependent or time-independent, and the presentation can switch between time dependency and time independency.

3. The configuration facility according to claim 1, wherein the presentation of the node tasks in the node task field and the presentation of the transmission tasks in the transmission task field is scalable in time.

4. The configuration facility according to claim 1, wherein the presentation of the node tasks in the node task field and the presentation of the transmission tasks in the transmission task field is a segment of an overall time configuration, and wherein the segment is selectable.

5. The configuration facility according to claim 1, wherein the presentation of the node tasks in the node task field and the presentation of the transmission tasks in the transmission task field is done as a bar chart, and wherein the user-manipulatable graphical interface comprises directional lines of connection to graphically coordinate node tasks and transmission tasks with each other.

6. The configuration facility according to claim 1, wherein the node tasks presented in the node task field and the transmission tasks presented in the transmission task field are selectable from the node tasks and the transmission tasks.

7. The configuration facility according to claim 1,
wherein a node bus structure field coordinated with the node task field is represented in addition to the node task field and a transmission bus structure field coordinated with the transmission task field is represented in addition to the transmission task field,
wherein the bus structure fields represent bus nodes, node tasks, transmission tasks, signals, frames and scheduled times, as a tree diagram, and, the time-triggered bus system is ordered in the bus structure fields and, a type of representation can be switched, with, the ordering being automatically transferred to the coordinated task fields so that the representation of the elements of the bus system is consistent in the bus structure fields and the corresponding task fields.

8. The configuration facility according to claim 7, wherein the user-manipulatable graphical interface is used to perform a coordination of node tasks with transmission tasks by coordinating elements of the node bus structure field with elements of the transmission task field or with elements of the transmission bus structure field, or to perform a coordination of transmission tasks with node tasks by coordinating elements of the transmission bus structure field with elements of the node task field or with elements of the node bus structure field.

9. The configuration facility according to claim 1, wherein the computer is programmed such that when an instance of a transmission task is selected in the transmission task field all instances of the selected transmission task in the transmission task field are shown highlighted.

10. A computer implemented method, comprising:
creating a node task program and a transmission task program for a time-triggered bus system, wherein the time-triggered bus system has bus nodes and a data bus coupling the bus nodes;
presenting the node tasks in time sequence in a node task field; and
presenting the transmission tasks in time sequence in a transmission task field separate from the node task fielt;
wherein the node task and the transmission task are executed by the bus nodes according to a configuration generated through a user-manipulatable graphical interface.

11. The configuration facility according to claim 6 wherein the node tasks presented in the node task field and transmission tasks presented in the transmission task field are selectable by bus node affiliation.

12. The configuration facility according to claim 6 wherein the node tasks presented in the node task field and the transmission tasks presented in the transmission task field are selectable by affiliation with a communication cycle.

13. The configuration facility of claim 1, wherein the computer generates a node task program and a transmission task program.

14. The configuration facility of claim 1, wherein the node task in the node task field and the transmission task in the transmission task field are coordinated with each other by graphic allocation through the user-manipulatable graphical interface.

* * * * *